(12) United States Patent
Kuckelkorn (10) Patent No.: US 9,920,956 B2
(45) Date of Patent: Mar. 20, 2018

(54) ABSORBER TUBE AND METHOD FOR THE REVERSIBLE LOADING AND UNLOADING OF A GETTER MATERIAL

(75) Inventor: Thomas Kuckelkorn, Jena (DE)

(73) Assignee: SCHOTT SOLAR AG, Mainz (DE)

( * ) Notice: Subject to any disclaimer, the term of this patent is extended or adjusted under 35 U.S.C. 154(b) by 1330 days.

(21) Appl. No.: 13/503,677

(22) PCT Filed: Oct. 26, 2010

(86) PCT No.: PCT/EP2010/066191
§ 371 (c)(1),
(2), (4) Date: Apr. 24, 2012

(87) PCT Pub. No.: WO2011/051298
PCT Pub. Date: May 5, 2011

(65) Prior Publication Data
US 2012/0211003 A1    Aug. 23, 2012

(30) Foreign Application Priority Data
Oct. 27, 2009    (DE) .................. 10 2009 046 064

(51) Int. Cl.
*F24J 2/24*        (2006.01)
*F24J 2/14*        (2006.01)
(Continued)

(52) U.S. Cl.
CPC ............... *F24J 2/14* (2013.01); *F24J 2/055* (2013.01); *F24J 2/24* (2013.01); *F24J 2/4612* (2013.01);
(Continued)

(58) Field of Classification Search
CPC .. F24J 2/24; F24J 2/05; F24J 2/10; F24J 2/46
(Continued)

(56) References Cited

U.S. PATENT DOCUMENTS 4,306,543 A * 12/1981 Doevenspeck .......... F24J 2/055
126/638
4,319,561 A * 3/1982 Pei .......................... F24J 2/055
126/584
(Continued)

FOREIGN PATENT DOCUMENTS

DE        2635262        2/1978
DE        2933901        3/1980
(Continued)

OTHER PUBLICATIONS

Written Opinion of the International Searching Authority dated Feb. 13, 2012 corresponding to International Patent Application No. PCT/EP2010/066191 with English translation, 13 pages.
(Continued)

*Primary Examiner* — Gregory Huson
*Assistant Examiner* — Nikhil Mashruwala
(74) *Attorney, Agent, or Firm* — Ohlandt, Greeley, Ruggiero & Perle, L.L.P.

(57) ABSTRACT

An absorber tube, especially for solar collectors in solar thermal power plants with at least one collector mirror, is provided. The absorber tube includes a metal tube for supplying and heating a heat transfer medium, a sheath tube surrounding the metal tube to form an annular space that can be evacuated, a wall extending through the sheath tube and the metal tube to seal the annular space, and a getter material binding free hydrogen in the annular space. The absorber tube has a temperature variation device that changes the temperature of the getter material and the wall.

18 Claims, 5 Drawing Sheets

(51) Int. Cl.
*F24J 2/05* (2006.01)
*F24J 2/46* (2006.01)

(52) U.S. Cl.
CPC ........... *F24J 2/4616* (2013.01); *F24J 2/4636* (2013.01); *F24J 2002/4681* (2013.01); *Y02E 10/44* (2013.01); *Y02E 10/45* (2013.01)

(58) Field of Classification Search
USPC ................................................ 126/653, 652
See application file for complete search history.

(56) References Cited

U.S. PATENT DOCUMENTS

| | | | | |
|---|---|---|---|---|
| 4,508,104 | A * | 4/1985 | Takeuchi | F24J 2/055 126/653 |
| 4,892,142 | A | 1/1990 | Labaton | |
| 7,013,887 | B2 * | 3/2006 | Kuckelkorn | F24J 2/055 126/652 |
| 7,240,675 | B2 * | 7/2007 | Eickhoff | F24J 2/055 126/652 |
| 7,552,726 | B2 * | 6/2009 | Kuckelkorn | F24J 2/055 126/651 |
| 7,806,115 | B2 * | 10/2010 | Kuckelkorn | F24J 2/055 126/652 |
| 2004/0134484 | A1 * | 7/2004 | Barkai | F24J 2/055 126/653 |
| 2007/0034204 | A1 * | 2/2007 | Kuckelkorn | F24J 2/055 126/570 |
| 2007/0039611 | A1 * | 2/2007 | Benvenuti | F24J 2/05 126/652 |
| 2010/0126499 | A1 | 5/2010 | Lu | |
| 2012/0048260 | A1 * | 3/2012 | Barkai | F24J 2/4612 126/653 |
| 2012/0186576 | A1 * | 7/2012 | Kuckelkorn | F24J 2/055 126/653 |
| 2012/0247456 | A1 * | 10/2012 | Martinez Sanz | F24J 2/055 126/653 |
| 2013/0025585 | A1 * | 1/2013 | Conte | F04B 37/04 126/651 |
| 2013/0220308 | A1 * | 8/2013 | Nunez Bootello | F24J 2/055 126/653 |
| 2014/0158113 | A1 * | 6/2014 | Urbano | F24J 2/055 126/653 |
| 2015/0168016 | A1 * | 6/2015 | Benz | F24J 2/055 126/652 |
| 2016/0102888 | A1 * | 4/2016 | Kuckelkorn | F24J 2/055 126/652 |

FOREIGN PATENT DOCUMENTS

| | | | |
|---|---|---|---|
| DE | 10231467 | 2/2004 | |
| DE | 10231467 A1 * | 2/2004 | ............... F24J 2/055 |
| DE | 102005022183 | 8/2006 | |
| DE | 102005057276 | 7/2007 | |
| EP | 0053852 | 6/1982 | |
| EP | 0286281 | 10/1988 | |
| JP | S55166362 U | 11/1980 | |
| JP | S56164469 U | 12/1981 | |
| JP | S57192749 A | 11/1982 | |
| JP | S63501728 A | 7/1988 | |
| JP | S6479545 A | 3/1989 | |
| JP | 5318835 B2 | 6/2011 | |
| JP | 5533596 B2 | 6/2012 | |
| WO | 2004063640 | 7/2004 | |

OTHER PUBLICATIONS

International Preliminary Report on Patentability dated May 8, 2012 corresponding to International Patent Application No. PCT/EP2010/066191 with English translation, 15 pages.

Japanese Office Action dated Aug. 19, 2014 for corresponding Japanese Patent Application No. 2012-535793 with English translation, 12 pages.

International Search Report dated Feb. 13, 2012 corresponding to International Patent Application No. PCT/EP2010/066191.

* cited by examiner

ABSORBER TUBE AND METHOD FOR THE REVERSIBLE LOADING AND UNLOADING OF A GETTER MATERIAL

The present invention relates to an absorber tube, in particular for solar collectors in solar thermal power plants, comprising a metal tube for supplying and heating a heat transfer medium, a sheath tube surrounding the metal tube for forming an annular space that can be evacuated, a wall extending between the sheath tube and the metal tube for sealing the annular space, and a getter material for binding free hydrogen found in the annular space. In addition, the invention relates to a method for the reversible loading and unloading of a getter material with free hydrogen. Further, the invention relates to a device for discharging free hydrogen from an annular space of an absorber tube as well as a corresponding method.

Solar collectors, for example, can be equipped with a parabola mirror, also called a collector mirror, and are used in so-called parabolic trough power plants. In known parabolic trough power plants, a thermal oil that can be heated up to approximately 400° C. by means of solar radiation reflected from the parabolic mirrors and focused onto the absorber pipe is used as the heat transfer medium. The absorber tube is thus usually composed of a metal tube, which has a radiation-absorbing layer and a sheath tube typically composed of glass, which surrounds the metal tube. The heated heat transfer medium is conducted through the metal tube and, for example, is introduced into a device for producing steam, with which the heat energy is converted into electrical energy in a thermal process. The metal tube and the sheath tube run parallel and concentrically to one another. An annular space, which is sealed axially by a wall that is usually composed of metal, is formed between the metal tube and the sheath tube. The individual absorber tubes are welded together approximately at lengths of up to 4 m and are formed into solar field loops with a total length of up to 200 m. Absorber tubes of this type are known, for example, from DE 102 31 467 B4.

The thermal oil used as the heat transfer medium with increasing aging releases free hydrogen that is dissolved in the thermal oil. The quantity of hydrogen being released, on the one hand, depends on the thermal oil used and on how well the thermal oil is maintained by the operator, but on the other hand, also by the amount of water that comes into contact with the thermal oil. As a consequence of permeation through the metal tube, the hydrogen being released gains access to the evacuated annular space, the permeation rate through the metal tube also increasing with increasing operating temperature of the metal tube. As a consequence of this, starting from a pressure between 0.0001 mbar and 0.001 mbar, the pressure in the annular space also increases, which has as a consequence an increase in heat conduction through the annular space, which in turn leads to elevated heat losses and to a smaller efficiency of the absorber tube or the solar collector.

In order to avoid the pressure increase in the annular space and thus to prolong the service life of the absorber tube, the hydrogen that has entered into the annular space can be bound by so-called getter materials. The absorption capacity of the getter materials is limited, however. After reaching the capacity limit, the pressure in the annular gap increases until it is in equilibrium with that in the free hydrogen dissolved from the thermal oil. According to previous investigations, the equilibrium pressure is a few mbars. Due to the hydrogen, an increased heat conduction arises in the annular gap with the above-named disadvantageous consequences for the efficiency of the solar collector. Absorber tubes that are provided with getter materials in the annular space are known, for example, from WO 2004/063640 A1.

An absorber tube is known from DE 10 2005 057 276 B3, in which noble gas is introduced into the annular space when the capacity of the getter material is exhausted. Noble gases have a small heat conductivity, so that the heat conduction through the annular gap can be reduced despite the presence of free hydrogen.

In both of the above-named devices, the free hydrogen gaining access to the annular space is bound only until the absorption capacity of the getter material is exhausted. The amount of noble gas that can be introduced into the annular space is also limited according to DE 10 2005 057 276 B3, so that both measures can increase the service life of the absorber tube only within certain limits.

EP 0 286 281 shows an absorber tube that comprises a membrane, through which free hydrogen can be transported from the annular space outwardly, in order to keep the concentration of free hydrogen small in the annular space.

The problem of the present invention is thus to provide an absorber tube that has an increased service life in comparison to the absorber tubes known from the prior art.

The problem is solved by an absorber tube of the type named initially, which has a temperature changing device for changing the temperature of the getter material and the wall.

The temperature changing device is to be understood as any device which is able to cause a change, both an increase and a decrease, in the temperature of the getter material and/or the wall.

The absorption capacity of the getter material for free hydrogen is dependent on temperature. For the getter materials that are usually used, the absorption capacity increases with decreasing temperature. According to the invention, it is thus possible to increase the absorption capacity during operation of the absorber tube by cooling the getter material. For the selection of a suitable material, on the other hand, the permeation rate of the free hydrogen through the wall increases greatly with increasing temperature of the wall, while the wall seals the annular space in a gas-tight manner for the usual temperatures that prevail during operation.

If the absorption capacity of the getter material is exhausted and it can no longer be appropriately increased by cooling, according to the invention, the temperature of the getter material and the wall is increased by means of the temperature changing device. The getter material, due to its now decreasing absorption capacity, releases free hydrogen into the annular space, which now can diffuse out of the annular space and through the wall. This diffusion process is supported by the fact that the pressure in the annular space increases with increasing concentration of free hydrogen.

As soon as the hydrogen that is released from the getter material has been discharged from the annular space, the temperature is again at the original value, that is, it decreases to the operating temperature, so that the permeation rate through the wall again decreases and the absorption capacity of the getter material for hydrogen increases. Now, free hydrogen that is newly released from the heat transfer medium and gains access into the annular space can be again bound by the getter material until the absorption capacity is exhausted. Then the above-described temperature change is carried out again. This process can be repeated as often as desired, so that the service life of the absorber tube can be clearly increased, which makes the operation of solar thermal power plants noticeably more efficient.

The getter material is usually pressed together into cylinder-shaped portions (pills). When the getter material is loaded with hydrogen, hydrides form, which lead to a change in volume and thus to a formation of particles. According to the invention, it is possible to carry out the temperature change and the discharge of the getter material even prior to obtaining the critical degree of loading in order to prevent the getter material from forming particles. The formation of particles is a disadvantage, since smaller particles at least, which cannot be retained, can move freely in the annular space and lead therein to local increases in temperature (hot spots), or can impair transmission by forming a dust coating, which adversely affects the service life and the efficiency of the absorber tube.

In a preferred embodiment of the present invention, in which the getter material is disposed in the annular space, the temperature changing device is disposed outside the annular space and opposite the getter material. By means of the arrangement of the temperature changing device outside the annular space, it is well accessible, so that it can be mounted and repaired in a simple way without having to intervene in the annular space. The arrangement of the getter material in the annular space opposite the temperature changing device assures that the temperature changes that are carried out also actually act on the getter material.

An advantageous embodiment of the present invention is characterized by a membrane that free hydrogen can penetrate for discharging the free hydrogen from the annular space. The membrane is impermeable to other types of gases. The membrane preferably is composed of palladium, niobium or pure iron or of alloys in which the named substances are contained. It can additionally be protected from corrosion by a suitable coating. The membrane can be inserted into the wall and is configured so that the temperature dependence of the permeation rate of the hydrogen is optimized for the temperatures prevailing during operation of the absorber tube. Palladium membranes are passivated below 200° C. The membrane can be activated by heating. In previously known solutions, membranes were integrated into the glass sheath or into the transition region between glass and metal expansion bellows (see EP 286 281 or U.S. Pat. No. 4,892,142). In this case, the membrane serves for a continuous permeation of the hydrogen from the annular gap into the atmosphere with a small differential pressure (<0.0001 mbar in the annular gap, 0.00005 mbar in the atmosphere). These solutions have the disadvantage that the temperature of the membrane is not defined. On the one hand, a passivation can be produced thereby when the critical temperature limit of the membrane is not exceeded, whereby the inner pressure increases. On the other hand, too great a heating may occur due to direct irradiation, which leads to high stresses in the glass or in the transition region and triggers the breaking of the sheath tube. The high incidence of breaking for this design is known from the operation of the Kramer Junction power plant in California. If a membrane that has a permeation rate that is very greatly dependent on temperature is selected, a small increase in the membrane temperature is sufficient to discharge the free hydrogen from the annular space without gases from outside penetrating into the annular space. The energy expenditure for the heating thus can be kept small.

The temperature changing device preferably changes the temperature of the membrane. In the above-described example of embodiment, the temperature of the membrane is changed by changing the wall temperature, and thus there is an indirect change of the membrane temperature due to heat conduction from the wall into the membrane. In this example of embodiment, the temperature of the membrane is changed directly, which is advantageous energetically.

The temperature of the getter material is changed indirectly via the membrane. Thus there is a temperature change from the temperature changing device via the membrane to the getter material.

In a preferred example of embodiment, in which the wall comprises a transition element and an outer ring, the membrane is disposed in or at the transition element and/or the outer ring. Transition elements and outer rings are usual components of known expansion compensation devices, with which the different expansions of the sheath tube and the metal tube are equilibrated and the annular space is sealed in a gas-tight manner in the region of the absorber tube. It is not necessary to manufacture the entire outer ring or the entire transition element as a membrane; rather, a specific section suffices for this purpose, whereby the manufacturing costs can be reduced. Further, commercial expansion compensation devices can be used, which only need to be provided with the membrane, so that the increased expenditure for technical manufacturing is small.

In an additionally preferred embodiment of the present invention, in which the absorber tube has an expansion bellows for equilibrating the different expansions of the sheath tube and the metal tube, the membrane is disposed in or on the expansion bellows. A cost-effective embodiment of the inventive principle can also be achieved in this way.

The membrane is preferably composed of iron, palladium or niobium. These three elements are characterized by a temperature dependence of their hydrogen permeation rate that is suitable for the conditions prevailing during operation of the absorber tube.

Advantageously, the expansion bellows and/or the wall comprise a doped region for increasing the permeability for free hydrogen. Here, for example, palladium atoms can be introduced into the base material of the expansion bellows or the wall. The doping method can be conducted today in a cost-effective manner, for example, by means of diffusion, sublimation from the gas phase or bombardment by means of high-energy particle guns under vacuum. For doping, only very small quantities of foreign atoms will be introduced into the base material, but these are sufficient to greatly influence the permeation rate. The quantity of palladium or niobium employed thus can be kept very small and a cost savings will be produced that outweighs the costs of the additional doping method.

In another enhancement of the invention, the getter material is filled into a container that is attached to the outer ring and/or to the transition element. The getter material is usually pressed together into pills. With increasing loading of the getter material with free hydrogen, hydrides form, which disrupt the cylinder-shaped pieces, so that they decompose into many small particles. In fact, in addition, free hydrogen can also be deposited on the getter material and the absorption capacity of the getter material is not changed. Of course, the small particles are distributed in an uncontrolled manner in the annular space, where they will be heated by reflected solar radiation and form local hot spots in the annular space, which can be negatively made noticeable on the heat output and the service life of the absorber tube. By means of the container, the getter material is fixed permanently at one site, so that the above-named disadvantages do not occur. In particular, the getter material may also be used in powder form. Further, the containers can be filled with the getter material prior to mounting when they are outside the annular space, so that the filled containers then only need to be inserted into the annular space, for which reason, the manufacture of the absorber tube is simplified.

Also, they can be joined with the outer ring or the transition element, e.g., by tacking or soldering prior to the assembly of the absorber tube.

Preferably, the container has holes for increasing the accessibility of the getter material for the free hydrogen in the annular space. These holes can be lasered microholes through which the hydrogen can easily pass, but the getter material cannot. In this way, the hydrogen can be well deposited on the getter material and again removed from it, without the getter material, particularly in powder form, being able to be distributed uncontrollably in the annular space.

In one advantageous embodiment, the container is shaped like a fabric sock. The fabric sock is flexible and can be inserted into the annular space without additional fastening devices. It is advantageous here that it can be filled with the getter material in a stretched state, but can be mounted in the annular space in a bent or curved state. For this purpose, the fabric sock has a closable joining device on both of its ends, by means of which it can be placed around the expansion bellows. for example, where it is fixed in place by friction. There is no need for keeping it at a specific installation site; rather, the fabric sock can be disposed at any place in the annular space.

Preferably, the outer ring has a projection extending into the getter material and the temperature changing device is disposed in the region of the projection. In this way, the usable surface for heat transmission is enlarged, so that the temperature changes of the getter material can be made more effective.

In a preferred enhancement of the present invention, the outer ring has a recess in the region of the projection, in which the temperature changing device is placed. This configuration makes it possible to bring the heat source or the heat sink very close to the getter material, so that the heat transfer can be further optimized.

The absorber tube according to the invention is enhanced so that the outer ring has an opening pointing into the getter material, this opening being sealed by the membrane. The membrane can be disposed in the opening itself in this case, or it can be formed as a cap sealing the opening. In this enhancement, the membrane can already be adapted to the dimensions of the opening, so that it need only be pushed onto it or plugged into it, which is advantageous from the viewpoint of technical manufacture.

In a preferred embodiment of the present invention, the outer ring and/or the transition element has/have a section that at least partially encloses the getter material. In this way, the usable surface for heat transmission is enlarged, so that the temperature changes of the getter material can be made more effective. When viewed from the annular space, the section can be arched outwardly, so that the surface that can be used for heat transmission from or into the environment of the absorber tube is enlarged.

The membrane is preferably disposed in this section. The transport of free hydrogen, which is released from the getter material, can be effectively discharged from the annular space in this way.

The temperature changing device is preferably adjacent to this section. In this way the temperature changes produced by the temperature changing device can be utilized over the surface enlarged by the section for heat transmission, so that the temperature of the getter material can be changed in a very effective way.

In another embodiment of the present invention, in which the expansion bellows has one or more folds, the temperature changing device runs at least partially in the folds of the expansion bellows. The manufacturing expenditure necessary for this is small; in addition, no noteworthy additional fastening measures are required. Since the expansion bellows is at least partially adjacent to the annular space, an effective change in the temperature of the getter material is possible here.

The temperature changing device is preferably designed as a heating device. In fact, in this embodiment, no cooling of the membrane or the wall is possible; however, the loading and unloading process for the getter material according to the invention can be efficiently conducted with technically simple commercial means.

The heating device preferably comprises a heating filament. A heating filament has the advantage that it can be installed in a flexible manner and the geometric ratios can be adapted to the absorber tube. In particular, it can be well installed in the recess of the outer ring.

In a favored embodiment of the absorber tube according to the invention, the heating device comprises an electrical coil and a metal disk for the inductive heating of the getter material. Since the annular space is sealed in a gas-tight manner and evacuated, it is not possible or it is possible only with disproportionately high expenditure to lead lines and wires from outside into the annular space without endangering the tight seal. With the electrical coil, the metal disk can be inductively heated without contact, independent of whether the metal disk is found in or outside the annular space. With a corresponding arrangement of the metal disk, it is possible to directly heat the getter material, so that now the membrane is indirectly heated. In this case, there occurs a temperature change from the temperature changing device via the getter material to the membrane.

The temperature changing device preferably comprises a heat pipe and/or a photovoltaic module. In this design, on the one hand, the heat can be transported over longer distances. Thus, it makes possible producing heat at any place and guiding it to where it is required. On the other hand, it can also discharge heat from places that need to be cooled. This has structural advantages, since the temperature changing device need not be disposed directly at the absorber tube, whereby problems that result from a lack of structural space can be circumvented. In addition, heat can be provided in a favorable and environmentally-friendly way with a photovoltaic module.

In a particularly preferred embodiment of the absorber tube, the temperature changing device comprises a cooling device. The advantage here is that heat is actively discharged from the absorber tube and the temperature of the getter material can be adjusted.

Another aspect of the invention relates to a method for the reversible loading and unloading of a getter material with free hydrogen in an absorber tube, comprising the following steps:

Loading the getter material at a first temperature,

Changing the temperature of the getter material to a second temperature by means of a temperature changing device,     Unloading the getter material at the second temperature, and     Changing the temperature of the getter material to the first temperature by means of the temperature changing device.

This method can be applied as often as desired, so that the getter material can be used repeatedly and thus clearly more effectively than is known in the case of absorber tubes known from the prior art, in which the getter material is only loaded once until its absorption capacity for free hydrogen is exhausted. The service life of the absorber tube can be clearly lengthened by means of the method according to the invention, for which reason solar thermal power plants can be operated more effectively.

For the getter materials that are usually used, the absorption capacity for free hydrogen decreases with increasing temperature. Unloading is thus effected by an increase in the temperature of the getter material. Consequently, the second temperature is usually higher than the first temperature. The first temperature in this case is for the most part the operating temperature of the absorber tube prevailing at the site where the getter material is installed. The first temperature, however, can be brought below the operating temperature of the absorber tube by the temperature changing device, so that the absorption capacity of the getter material is further increased.

Another aspect of this invention relates to a method for changing the temperature of a getter material in an annular space of an absorber tube, comprising the following steps:
Changing the temperature of a membrane or a wall by means of a temperature changing device, and
Changing the temperature of the getter material by means of the membrane.

In this case, the change in the temperature of the getter material is produced along the path from the temperature changing device via the membrane and/or the wall to the getter material. The getter material is thus indirectly heated with the intermediate connection of the membrane and/or the wall.

Another aspect relates to a method for changing the temperature of a membrane and/or a wall of an absorber tube, comprising the following steps:
Changing the temperature of a getter material by means of a temperature changing device, and
Changing the temperature of the membrane and/or a wall by means of the getter material.

In this case, the change in the temperature of the membrane and/or the wall is produced along the path from the temperature changing device via the getter material to the membrane and/or the wall. The getter material is thus indirectly heated with the intermediate connection of the membrane and/or the wall.

Another aspect of this invention relates to a device for discharging free hydrogen from an annular space of an absorber tube, comprising
An absorber tube according to one of the above-named embodiments,
A temperature measuring unit for determining the temperature value of the sheath tube, and
A comparison unit for comparing the temperature value of the sheath tube that has been determined with a selectable critical temperature value.

With this device, it is possible to allow the loading and unloading of the getter material to run automatically. The absorber tubes are thus always operated in the optimal range and maintenance personnel who monitor the loading and unloading are not necessary.

Another aspect relates to a method for discharging free hydrogen from an annular space of an absorber tube, comprising the following steps:
Determining the temperature value of the sheath tube by means of a temperature measuring unit,
Comparing the temperature value that has been determined with a selectable critical temperature value by means of a comparison unit, and
Changing the temperature of the getter material and the wall and/or the membrane with the temperature changing device in such a way that the hydrogen bound to the getter material is released and discharged from the annular space.

The method according to the invention is preferably conducted in the indicated sequence, but other sequences are also conceivable. The advantages of this method coincide with those that were discussed for the corresponding device according to the invention for discharging free hydrogen from an annular space of an absorber tube.

The invention will now be described in detail based on the preferred examples of embodiment with reference to the figures. Here.

Figure 1:
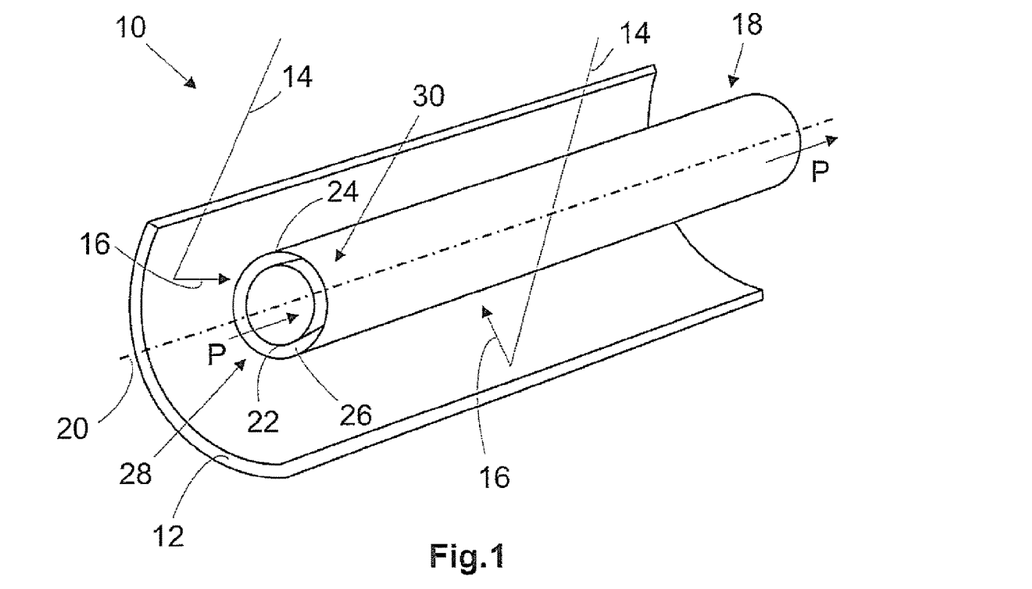
FIG. 1 shows a schematic representation of a solar collector.

A solar collector 10 of the known type is shown in FIG. 1. Solar collector 10 comprises a collector mirror 12, which reflects solar irradiation 14 and directs the reflected solar irradiation 16 onto an absorber tube 18. Collector mirror 12 is configured in trough shape, so that it brings about a focusing of the reflected solar radiation along a focal line through which runs a longitudinal axis 20 of absorber tube 18. Absorber tube 18 has a metal tube 22 and a sheath tube 24. Metal tube 22 is coated with a radiation-absorbing layer and a heat transfer medium flows through it. Sheath tube 24 surrounds metal tube 22, so that an annular space 26 is formed between metal pipe 22 and sheath tube 24. Sheath tube 24 is typically composed of glass. Based on the trough-shaped configuration of collector mirror 12, absorber tube 18 can be divided into one half 28 facing collector mirror 12 and one half 30 turned away from it.

The flow direction of the heat transfer medium is indicated by the arrow P. By flowing through metal tube 22, the heat transfer medium will be heated by reflected solar radiation 16. The temperature that can be reached amounts to approximately 400° C. The heated heat transfer medium is introduced into a process that is not shown in more detail here, in which electrical energy is obtained. The half 30 of absorber tube 18 that is turned away from collector mirror 12 is cooled by mixed convection, thus by natural convection and by forced convection due to wind, for example, which leads to heat losses and thus adversely affects the heating process of the heat transfer medium. Thus, one attempts to reduce the heat conduction from metal tube 22 outwardly as much as possible, which is carried out by means of the annular space 26 formed with sheath tube 24. The latter is evacuated, whereby the heat conduction through annular space 26 is reduced and thus the heat losses are limited.

Figure 2:
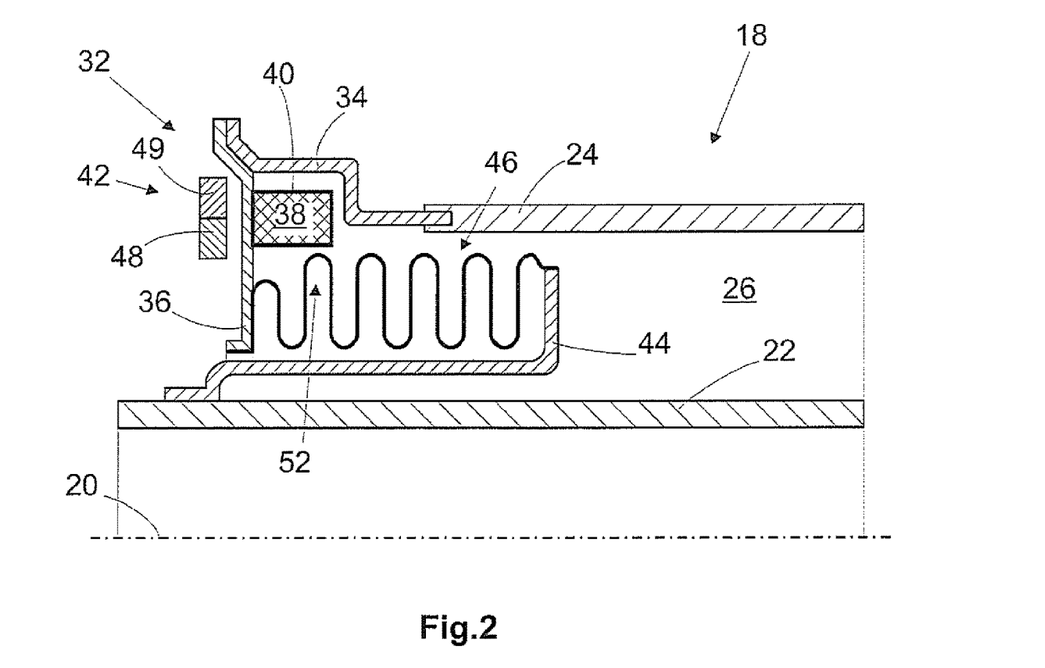
FIG. 2 shows a first example of embodiment of an absorber tube according to the invention in a half-sectional representation.

FIG. 2 shows a first example of embodiment of absorber tube 18 according to the invention in a half-sectional view. Absorber tube 18 comprises a wall 32, which is composed of a transition element 34 and an outer ring 36 in the example of embodiment shown, the transition element 34 being connected to sheath tube 24. This wall 32 seals annular space 26 in a gas-tight manner in the axial direction of the longitudinal axis 20 of the absorber tube.

A container 40 filled with a getter material 38 is fastened to outer ring 36, e.g., by tacking, soldering or gluing. A fastening to transition element 34 could also be provided. Outside annular space 26, adjacent to container 40, a temperature changing device 42 is introduced, which is disposed so that it can change the temperature of wall 32, in the example shown, the temperature of outer ring 36. For this purpose, temperature changing device 42 comprises a heating device 48 and a cooling device 49. Since container 40 is fastened to outer ring 36, the change in the temperature of outer ring 36, in particular, also effects a change in the temperature of getter material 38 due to heat conduction.

Further, absorber tube 18 comprises a connection element 44, which is connected to metal tube 22, and an expansion bellows 46, which equilibrates differences in the expansion of sheath tube 24 and metal tube 22 during the operation of absorber tube 18. In this embodiment, outer ring 36 is applied to connection element 44, but can be displaced axially on it.

Figure 3:
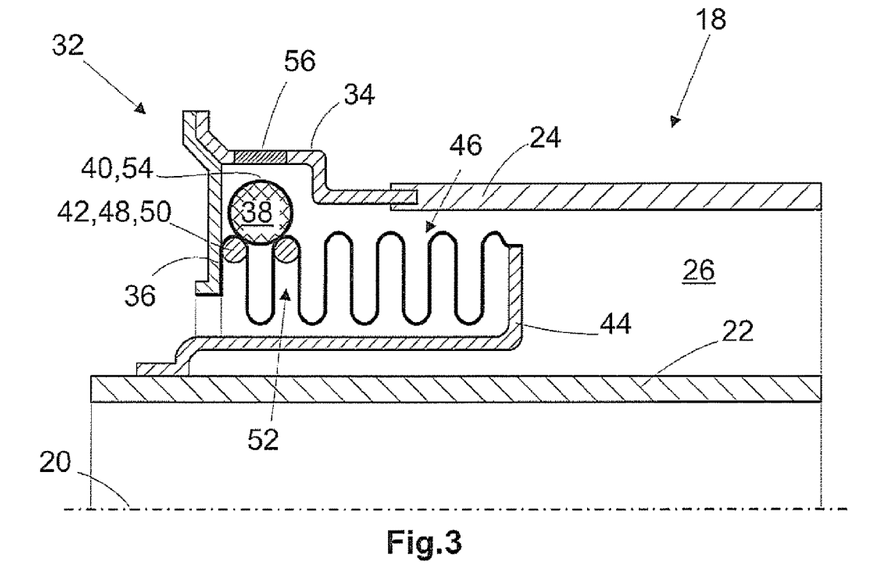
FIG. 3 shows a second example of embodiment of the absorber tube according to the invention in a half-sectional representation.

A second example of embodiment of absorber tube 18 according to the invention is shown in FIG. 3. The temperature changing device 42 is designed as heating device 48, which comprises a heating filament 50, which is installed in turn in folds 52 of expansion bellows 46. Here, outer ring 36 is not applied to connection element 44, so that expansion bellows 46 is accessible on the side turned away from annular space 26. Container 40, in which is found getter material 38, is designed as a fabric sock 54, which is installed in annular space 26 on expansion bellows 46. A membrane 56, through which free hydrogen can diffuse upon a change in the temperature of membrane 56 is disposed in transition element 34. The heating filament 50 first heats getter material 38 by expansion bellows 46, and the getter material in turn heats membrane 56, so that membrane 56 is indirectly heated.

Figure 4:
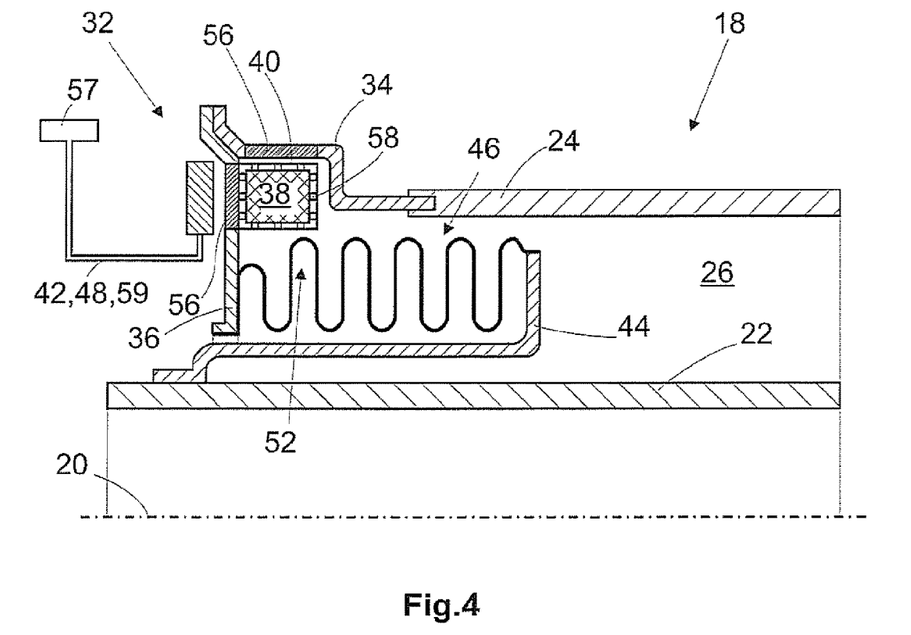
FIG. 4 shows a third example of embodiment of the absorber tube according to the invention in a half-sectional representation.

A third example of embodiment of absorber tube 18 is shown in FIG. 4. Here, getter material 38 is found in turn in container 40, which has a number of holes 58 that are dimensioned so that free hydrogen can easily pass through, but getter material 38 remains in container 40. Both transition element 34 and the outer ring have membrane 56. Temperature changing device 42 in this case is designed as a heat pipe or as a photovoltaic module 59. These serve for heat transport over longer distances. Thus, they make possible producing heat at any place and guiding it to where it is required. On the other hand, they can also discharge heat from places that must be cooled. In the present case, heat is produced at one end 57 of heat pipe 59 and released in the direct vicinity of membrane 56 of outer ring 36. The latter is first heated thereby, so that getter material 38 is heated indirectly here. This also applies analogously to a reduction in temperature. Photovoltaic module 59 in addition makes possible the very favorable and environmentally-friendly production of heat.

Figure 5:
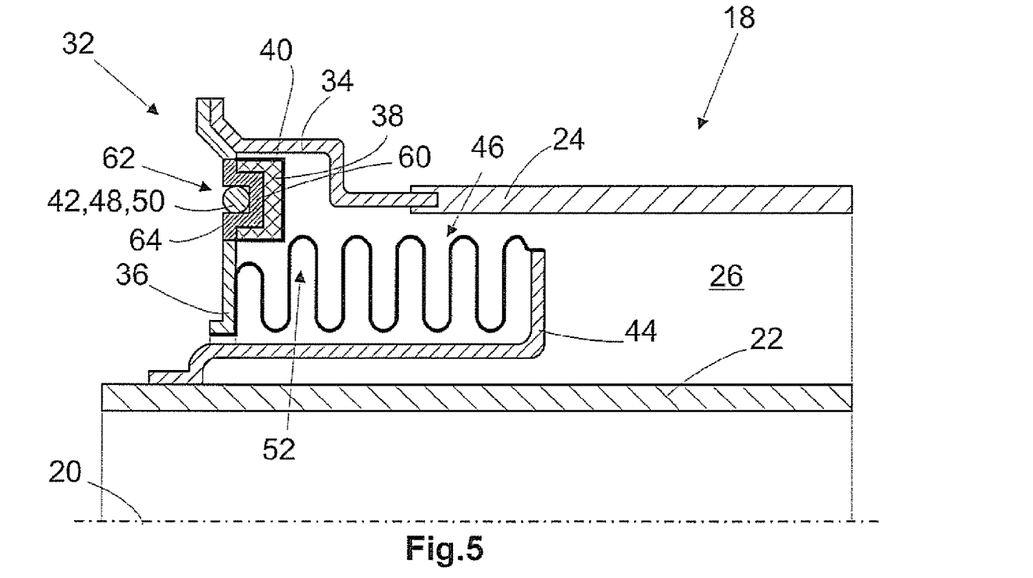
FIG. 5 shows a fourth example of embodiment of the absorber tube according to the invention in a half-sectional representation.

In the fourth example of embodiment, which is shown in FIG. 5, outer ring 36 has a projection 60 which extends into getter material 38 and a recess 62, which is found in the direct vicinity of projection 60. Heating filament 50 of heating device 48 runs in this recess 62, so that the temperature of getter material 38 can be increased very effectively. Further, outer ring 36 has a doped region 64, which is also found in the direct vicinity of projection 60 and includes projection 60.

Figure 6:
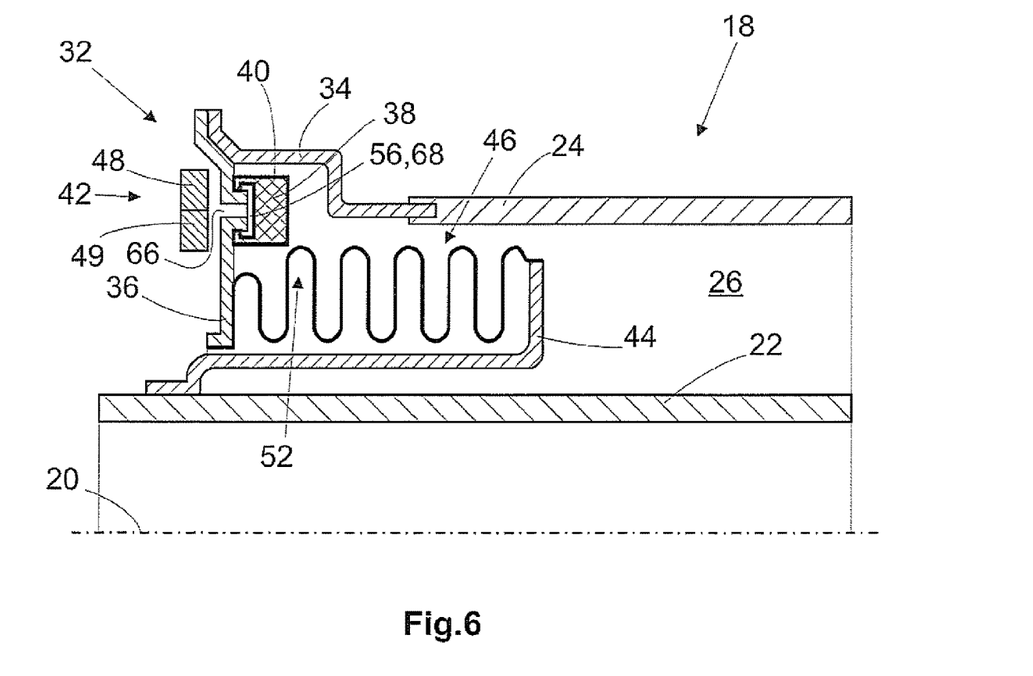
FIG. 6 shows a fifth example of embodiment of the absorber tube according to the invention in a half-sectional representation.

A fifth example of embodiment of absorber tube 18 according to the invention is shown in FIG. 6. Here, outer ring 36 has an opening 66, which projects into getter material 38 and is closed by membrane 56. In the example shown, membrane 56 is designed as a cap 68, which seals opening 66. Temperature changing device 42 is disposed in the direct vicinity of opening 66, so that it can change the temperature of membrane 56 and getter material 38.

Figure 7:
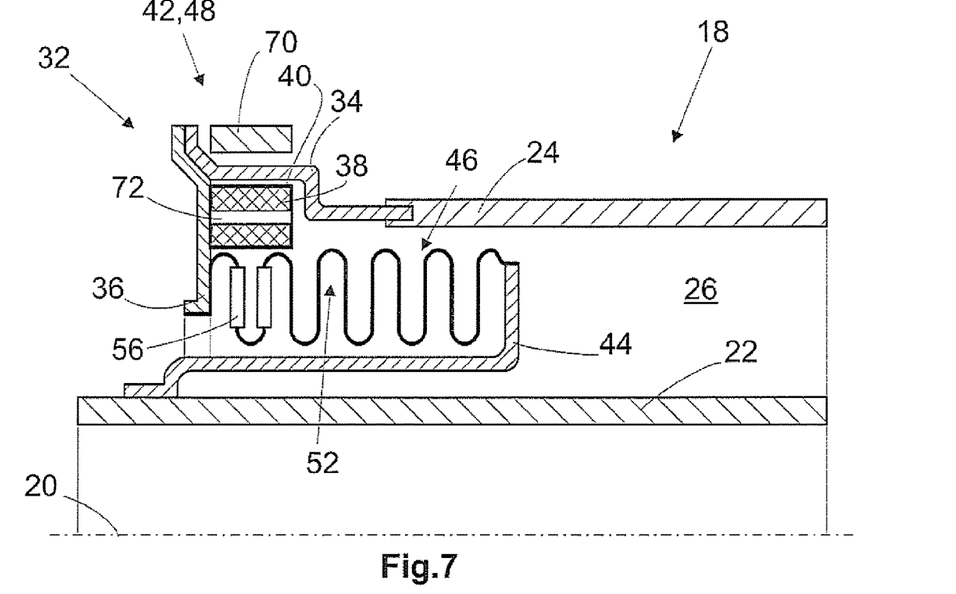
FIG. 7 shows a sixth example of embodiment of the absorber tube according to the invention in a half-sectional representation.

In the sixth example of embodiment of absorber tube 18, which is shown in FIG. 7, temperature changing device 42 comprises an electrical coil 70 and a metal disk 72. Metal disk 72 and electrical coil 70 are thus aligned so that metal disk 72 can be heated inductively with electrical coil 70. In this case, metal disk 72 is disposed in getter material 38, so that getter material 38 can be directly heated. In this example of embodiment, membrane 56 is disposed in expansion bellows 46 and is heated indirectly via getter material 38.

Figure 8:
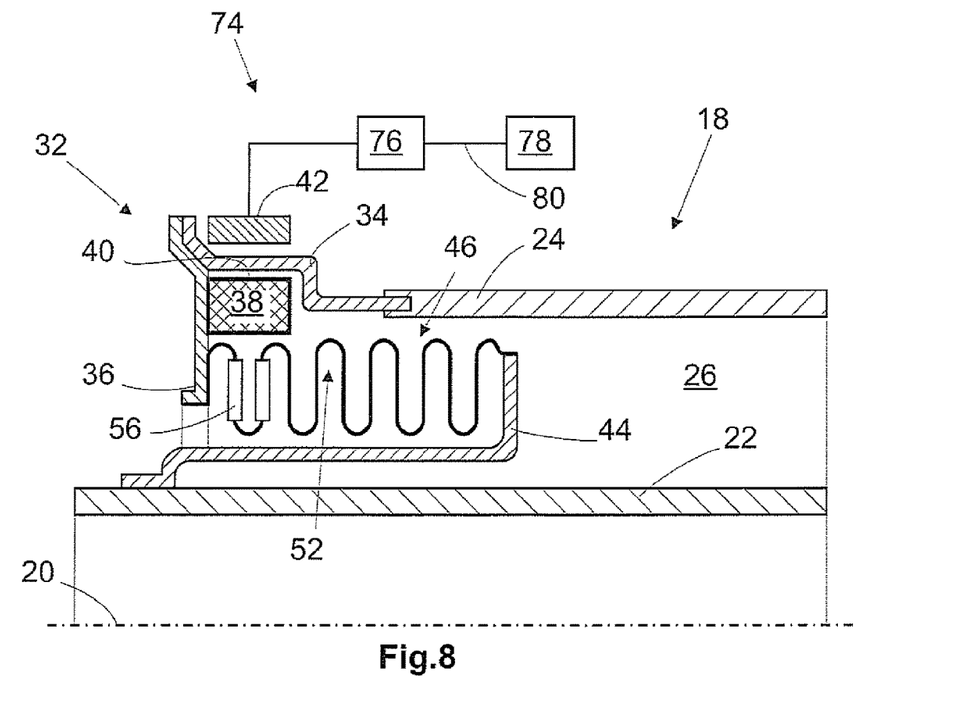
FIG. 8 shows a seventh example of embodiment of the absorber tube according to the invention in a half-sectional representation.

A device 74 for discharging free hydrogen from an annular space 26 of an absorber tube 18 is shown schematically in FIG. 8. It comprises absorber tube 18 according to the sixth example of embodiment, which is shown in FIG. 2, all other examples of embodiment also being able to be used. Temperature changing device 42 is connected to a comparison unit 76, which in turn is connected to a temperature measuring unit 78. The connection in this case is provided via a cable 80, a wireless connection also being conceivable. A computer or microcomputer can serve as comparison unit 76; a temperature measuring unit 78 can be designed as a thermal imaging camera or a temperature sensor.

Temperature measuring unit 78 determines the value of the temperature of sheath tube 24 and further guides the determined value to comparison unit 76, which compares this with a critical temperature value that can be selected and introduced into comparison unit 76. If the determined temperature value of sheath tube 24 exceeds the critical temperature value, this is a sign of an accumulation of free hydrogen in annular space 26 of absorber tube 18 and that the absorption capacity of getter material 38 for free hydrogen is exhausted. In this case, comparison unit 76 can cause temperature changing device 42 to reduce the temperature of getter material 38 in order to increase its absorption capacity. Alternatively, comparison unit 76 can effect an increase in the temperature of getter material 38 and wall 32, whereby the bound hydrogen is released from getter material 38 and is discharged from annular space 26 through membrane 56.

Figure 9:
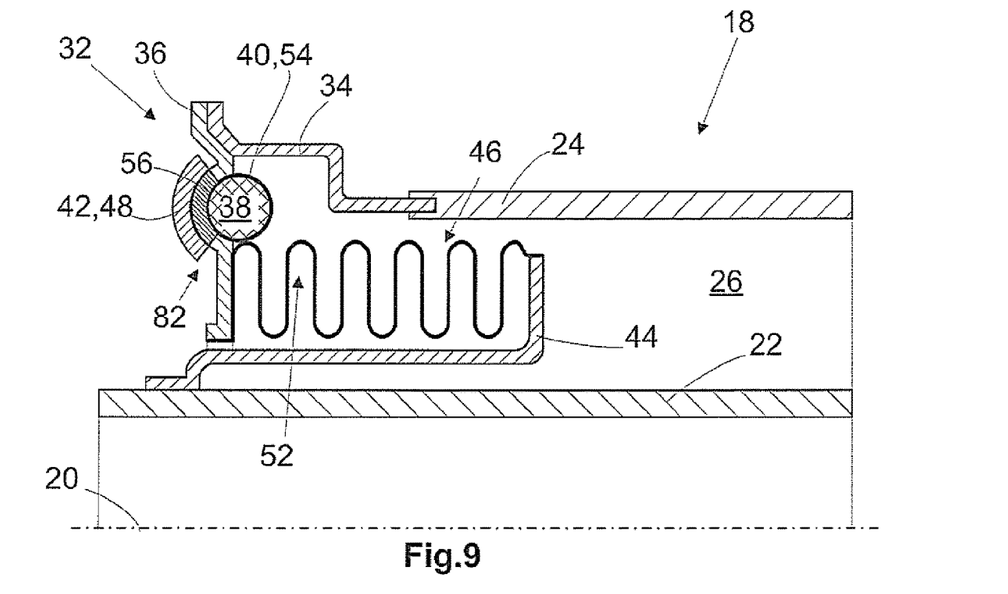
FIG. 9 shows an eighth example of embodiment of the absorber tube according to the invention in a half-sectional representation.

In the example of embodiment shown in FIG. 9, outer ring 36 has a section 82 that at least partially encloses getter material 38. Membrane 56 is disposed in region 82 in the example shown. Temperature changing unit 42, which is designed, for example, as heating device 48, is also disposed in this region 82.

Figure 10:
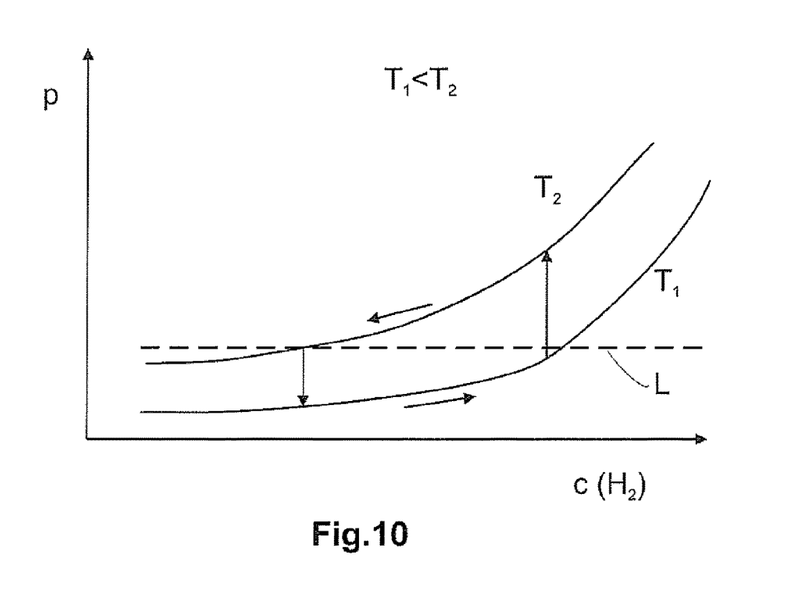
FIG. 10 shows a graphic representation of the method for the reversible loading and unloading of a getter material with free hydrogen.

The method for the reversible loading and unloading of a getter material 38 with free hydrogen is shown graphically in FIG. 10. Here, the dependence of the pressure p in annular space 26 is plotted for an isothermally running increase in the concentration of free hydrogen in getter material 38 for a first temperature $T_1$ and a second temperature $T_2$ of getter material 38. The first temperature $T_1$ is thus lower than the second temperature $T_2$. In this case, a line L marks the maximum absorption capacity of getter material 38 for free hydrogen. It can be seen that the absorption capacity of getter material 38 in the case of the lower temperature $T_1$ is higher than for the higher temperature $T_2$ (points of intersection of the isotherms with line L).

The hydrogen entering into the annular space is bound to getter material 38 until the maximum absorption capacity of getter material 38 is reached. This loading occurs at the temperature $T_1$ in the example shown. Upon reaching the maximum absorption capacity for the first temperature $T_1$ or, as shown, just prior to it, by activating temperature changing device 42, the temperature of getter material 38 increases from the first temperature $T_1$ to the second temperature $T_2$. The increase in the temperature prior to reaching the maximum absorption capacity prevents particle formation of the getter material. At the second temperature $T_2$, the getter material 38 has a smaller absorption capacity, so that the bound free hydrogen is released until the maximum absorption capacity of getter material 38 is reached for the second temperature $T_2$. At this point (point of intersection of the isotherm $T_2$ with L, the temperature of getter material 38 is reduced to the first temperature $T_1$ at which the absorption capacity is higher, so that getter material 38 can absorb additional free hydrogen.

The changes in the temperature of getter material 38 accompany changes in the temperature of wall 32 and/or membrane 56 and/or expansion bellows 46. Since wall 32 is usually at least partially produced from metal, in particular from iron-containing materials, it has a temperature-dependent permeability that increases with increasing temperature. The same also applies to expansion bellows 46, as long as it is produced from metal materials as well as for membrane 56 and the doped region 64 of wall 32 or of expansion bellows 46.

The invention has been described in detail on the basis of several preferred embodiment examples. Modifications or variations resulting in an obvious way for a person skilled in the art from the description do not deviate from the concept that is the basis for the invention and are contained within the protective scope, which is defined by the following claims.

LIST OF REFERENCE CHARACTERS

10 Solar collector
12 Collector mirror
14 Solar irradiation
16 Reflected solar irradiation
18 Absorber tube
20 Longitudinal axis
22 Metal tube
24 Sheath tube
26 Annular space
28 Half of the absorber tube facing the collector mirror
30 Half of the absorber tube turned away from the collector mirror
32 Wall
34 Transition element
36 Outer ring
38 Getter material
40 Container
42 Temperature changing device
44 Connection element
46 Expansion bellows
48 Heating device
49 Cooling device
50 Heating filament
52 Folds
54 Fabric sock
56 Membrane
57 End
58 Holes
59 Heat pipe, photovoltaic module
60 Projection
62 Recess
64 Doped region
66 Opening of the outer ring
68 Cap
70 Electrical coil
72 Metal disk
74 Device
76 Comparison unit
78 Temperature measuring unit
80 Cable
82 Section
L Line
$T_1$ First temperature
$T_2$ Second temperature

The invention claimed is:

1. An absorber tube for solar collectors in solar thermal power plants, comprising:
    a collector mirror that reflects solar irradiation and directs the reflected solar irradiation onto the absorber tube;
    a metal tube that conducts and heats a heat transfer medium;
    a sheath tube surrounding the metal tube, the sheath tube forming an annular space that can be evacuated;
    a wall running between the sheath tube and the metal tube to seal the annular space;
    a getter material configured to bind free hydrogen that is present in the annular space;
    a membrane in the wall that is permeable to the free hydrogen, and purges free hydrogen from the annular space; and
    a temperature changing device that changes a temperature of the getter material, the wall, and the membrane.

2. The absorber tube according to claim 1, wherein the wall comprises a transition element and an outer ring, the membrane being disposed in or on the transition element and/or the outer ring.

3. The absorber tube according to claim 1, further comprising an expansion bellows that equilibrates expansion differences between the sheath tube and the metal tube.

4. The absorber tube according to claim 1, wherein the membrane comprises a material selected from the group consisting of iron, palladium, and niobium.

5. The absorber tube according to claim 3, wherein the expansion bellows and/or the wall comprise(s) a doped region that increases permeability for the free hydrogen.

6. The absorber tube according to claim 2, wherein the getter material is in a container that is fastened to the outer ring and/or to the transition element.

7. The absorber tube according to claim 6, wherein the container comprises a fabric sock.

8. The absorber tube according to claim 2, wherein the outer ring has an opening that points towards the getter material and that is sealed by the membrane.

9. The absorber tube according to claim 2, wherein the outer ring and/or the transition element has a section that at least partially encloses the getter material.

10. The absorber tube according to claim 9, wherein the membrane is disposed in the section.

11. The absorber tube according to claim 9, wherein the temperature changing device is adjacent to the section.

12. The absorber tube according to claim 3, wherein the temperature changing device runs at least partially in folds of the expansion bellows.

13. The absorber tube according to claim 1, wherein the temperature changing device comprises a heating device.

14. The absorber tube according to claim 13, wherein the heating device comprises a heating filament.

15. A method for changing the temperature of a membrane of an absorber tube, the absorber tube comprising:
- a collector mirror that reflects solar irradiation and directs the reflected solar irradiation onto the absorber tube;
- a metal tube that conducts and heats a heat transfer medium;
- a sheath tube surrounding the metal tube, the sheath tube forming an annular space that can be evacuated;
- a wall running between the sheath tube and the metal tube to seal the annular space;
- a getter material configured to bind free hydrogen that is present in the annular space;
- a membrane in the wall that is permeable to the free hydrogen, and purges free hydrogen from the annular space; and
- a temperature changing device that changes a temperature of the getter material, the wall, and the membrane, the method comprising the steps of:
- reflecting solar irradiation and directing the reflected solar irradiation onto the absorber tube with a collector mirror;
- changing the temperature of a getter material by a temperature changing device; and
- changing the temperature of the membrane by the getter material.

16. A method for the reversible loading and unloading of a getter material with free hydrogen in an absorber tube, comprising the following steps:
- reflecting solar irradiation and directing the reflected solar irradiation onto the absorber tube with a collector mirror;
- loading the getter material at a first temperature ($T_1$);
- changing the temperature of the getter material to a second temperature ($T_2$);
- unloading the getter material at the second temperature ($T_2$); and
- changing the temperature of getter material to the first temperature ($T_1$).

17. A device for discharging free hydrogen from an annular space of an absorber tube, comprising:
- a collector mirror that reflects solar irradiation and directs the reflected solar irradiation onto the absorber tube;
- a metal tube that conducts and heats a heat transfer medium;
- a sheath tube surrounding the metal tube, the sheath tube forming an annular space that can be evacuated;
- a wall running between the sheath tube and the metal tube to seal the annular space;
- a getter material configured to bind free hydrogen that is present in the annular space;
- a membrane in the wall that is permeable to the free hydrogen, and purges free hydrogen from the annular space; and
- a temperature changing device that changes a temperature of the getter material, the wall, and the membrane;
- a temperature measuring unit that determines a temperature value of the sheath tube; and
- a comparison unit that compares the temperature value of the sheath tube to a selectable critical temperature value.

18. A method for discharging free hydrogen from an annular space of an absorber tube, comprising the following steps:
- reflecting solar irradiation and directing the reflected solar irradiation onto the absorber tube with a collector mirror;
- determining a temperature value of a sheath tube of the absorber tube by a temperature measuring unit;
- comparing the temperature value with a selectable critical temperature value by a comparison unit; and
- changing the temperature of a getter material, a wall, and/or a membrane of the absorber tube with a temperature changing device so that hydrogen that is bound to the getter material is released and is discharged from the annular space.

* * * * *